United States Patent [19]
Kasanic

[11] Patent Number: 6,053,591
[45] Date of Patent: Apr. 25, 2000

[54] CABINET HAVING A TAMBOUR DOOR AND AN ATTACHMENT MECHANISM

[75] Inventor: Joseph M. Kasanic, Medina, Ohio

[73] Assignee: Rubbermaid Incorporated, Wooster, Ohio

[21] Appl. No.: 09/031,986

[22] Filed: Feb. 27, 1998

[51] Int. Cl.[7] .................................................. G06B 9/15
[52] U.S. Cl. ............................ 312/297; 403/252; 52/79.5
[58] Field of Search ................................... 52/79.5, 27.5; 130/231.2, 231.1, 232, 235; 312/257.1, 263, 265.5, 297; 403/231, 252, 263

[56] References Cited

U.S. PATENT DOCUMENTS

| | | | |
|---|---|---|---|
| 2,172,956 | 9/1939 | Derman | 312/190 |
| 2,236,870 | 4/1941 | Derman | 312/144 |
| 2,766,822 | 10/1956 | Potter | 160/201 |
| 2,827,118 | 3/1958 | Wendt | 160/363 |
| 2,878,153 | 3/1959 | Hacklander | 154/106 |
| 2,978,020 | 4/1961 | Paulsrude | 160/183 |
| 3,066,995 | 12/1962 | Derman | 312/297 |
| 3,110,533 | 11/1963 | LeBron | 312/222 |
| 3,222,437 | 12/1965 | Schilling | 264/54 |
| 3,359,594 | 12/1967 | Pastoor | 160/235 |
| 3,447,199 | 6/1969 | Trimble | 16/150 |
| 4,441,768 | 4/1984 | Clarkson | 312/257 |
| 4,681,379 | 7/1987 | Pillinini | 312/297 |
| 5,368,380 | 11/1994 | Mottmiller et al. | 312/263 |

FOREIGN PATENT DOCUMENTS

| | | | |
|---|---|---|---|
| 901110 | 1/1945 | France | 160/235 |
| 9101098 | 2/1991 | WIPO | 312/265.5 |

OTHER PUBLICATIONS

Catalog page, Cabinets; Kombox, Shern Diau Enterprise Co., Ltd., No. 9, Lane 390, Sec. 2 Wan Shou Road, Kuei Shan Hsiang Taoyuan Hsien Taiwan, Republic of China. Published at least as early as Jan., 1998.

Catalog page, Cabinets; Richell Corporation, 136 Sakuragi Mizuhashi Toyama, Toyama 939–05, Japan. Published at least as early as Jan., 1998.

P. 88, tabs; The Little Tikes Company, 2180 Barlow Road, Hudson, Ohio 44236. Publication date 1996.

Assembly instructions, tabs; Rubbermaid Incorporated, 1147 Akron Road, Wooster, Ohio 44691. Publication date 1994.

*Primary Examiner*—Peter M. Cuomo
*Assistant Examiner*—Jerry A. Anderson
*Attorney, Agent, or Firm*—Richard B. O'Planick

[57] ABSTRACT

A cabinet is provided which is uniquely configured for uncomplicated use, particularly in environments with limited space. Specifically, the cabinet has a tambour door. The tambour door includes both a mechanical hinge and a flex hinge. Together the flex hinge and the mechanical hinge cooperate to provide the necessary flexibility to the tambour door. Secondly, this invention also provides an attachment mechanism that allows the cabinet to be assembled in an uncomplicated manner. Specifically, the attachment mechanism utilizes a plurality of joints that are defined by a male anchor portion and a female socket portion. Preferably, the attachment mechanism is integrally formed with the cabinet.

13 Claims, 8 Drawing Sheets

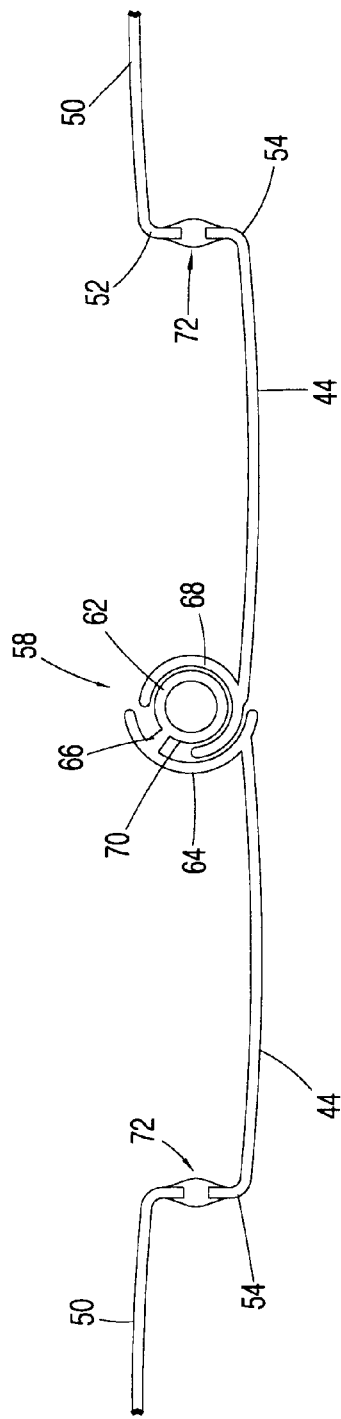
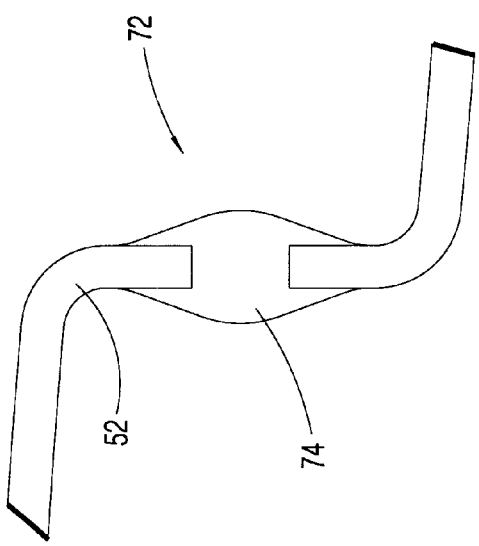

CABINET HAVING A TAMBOUR DOOR AND AN ATTACHMENT MECHANISM

This invention relates to structures for storing objects. More particularly, this invention relates to cabinets that are designed to effectively organize and store objects.

BACKGROUND OF THE INVENTION

Cabinets are well known in the art. Generally, cabinets include a pair of side panels, a rear panel, a top panel and a bottom panel attached together through a variety of means. Commonly, the panels are attached together through screws, nails or the like. Often several shelves are horizontally attached within such cabinets to allow objects to be organized and stored by the user.

Frequently, doors are utilized to isolate the interior of the cabinet from the remainder of the user's environment. For instance, it is well known in the art to provide a flat panel that is attached by a mechanical hinge which is pivotable between an open position and a closed position. Although such devices perform adequately, some users have found that such doors have several drawbacks as well. Namely, such devices require a substantial amount of clearance for the door to be pivoted into the opened position. This limitation for cabinets constructed with a flat panel door has proved to be undesirable when the space in which such doors are utilized is limited.

Various advancements have been suggested to overcome the above disadvantages. For instance, U.S. Pat. No. 2,766,822 to Potter suggests a cabinet having a roll-top, or tambour door. Specifically, the tambour door suggested by Potter includes a plurality of rigid members, or slats, that are pivotably interconnected through a link structure, or mechanical hinge. Accordingly, each rigid member can be pivoted relative to a neighboring adjacent rigid member. In addition, the link structure to Potter also includes a plurality of rollers that engage a channel disposed on the cabinet such that the rigid members may move along the channel between an open and closed position.

Although the device to Potter advances the art, one can appreciate that such devices may be substantially improved upon. First, Potter utilizes mechanical hinges to provide the tambour door with the necessary flexibility. However, mechanical hinges oftentimes have a tendency to become jammed while in use do to the fact that the door is comprised of a discrete set of members each of which is rigid. Furthermore, the radius of curvature that such tambour doors may achieve is often defined by the number of mechanical hinges. Accordingly, one skilled in the art can appreciate that increasing the number of mechanical hinges may result in improved performance; however, doing so would result in an overall increase in labor and manufacturing cost.

Other tambour doors have been suggested to improve the art. For instance, U.S. Pat. No. 2,978,020 to Paulsrude and U.S. Pat. No. 3,110,533 to Bron each suggests providing a door constructed from a plurality of rigid members with each rigid member being connected to an adjacent rigid member by a pliable connector. These devices allow the members to be pivotably interconnected; however, these doors also have several disadvantages. First, tambour doors constructed in accordance with the above do not allow for the user to easily remove a particular member. Accordingly, these tambour doors do not allow the user to remove members that have become damaged with use. Further, the members can not be easily disassembled for storage or shipment.

In addition to the above, it is well known that cabinets may be assembled through a variety of separate attachment mechanisms such as nails or screws. Yet, utilizing such attachment mechanisms also has several drawbacks. Specifically, for the user to assemble the cabinet with such an attachment mechanism, the user is required to perform a substantial amount of labor. Also, when it is desirable to ship cabinets disassembled for assembly by the user, the user is often required to have several tools and to be somewhat adept in construction techniques. Finally, great care must be exercised by the manufacturer when the cabinets are sold disassembled. Attachment devices such as nails or screws are commonly lost or misplaced during shipment.

One skilled in the art can best appreciate that the cabinets of the above mentioned character could be substantially improved upon. Specifically, it would be desirable to have a cabinet where each member of the tambour door is capable of being separated from association with the other members, thereby allowing each member to be shipped and stored in a compact manner. It would also be desirable to have a cabinet where the tambour door operates more effectively. In addition, it would be desirable to have a tambour door that is not prone to become jammed while in use. Also, it would be desirable to have a tambour door that reduces the labor costs associated with assembling and attaching the mechanical hinges necessary to provide flexibility to the door.

Also, it would be desirable to have a cabinet that includes an attachment mechanism which is capable of attaching each of the panels together without the use of traditional attachment mechanisms which require a substantial amount of technical skill. Finally, it would be desirable that any such attachment mechanism be designed to reduce or eliminate the opportunity for the attachment device to be lost or misplaced prior to use.

SUMMARY OF THE INVENTION

It is an object of this invention to provide a cabinet with a tambour door that has a reduced likelihood of becoming jammed during use.

It is a further object of this invention that the cabinet is capable of providing a decreased radius of curvature without increasing the number of mechanical hinges.

It is still a further object of this invention that the tambour door includes a plurality of slats where each slat is removable at the option of the user.

It is an additional object of this invention to provide cabinet that is assembled with an attachment mechanism which reduces the skill required by the user to assemble the cabinet.

A further object is to provide a tambour door which is configured having integral gripping portions whereby the door can be digitally grasped and rolled into the open condition.

This invention provides a cabinet for storing articles. The cabinet of this invention includes a pair of side panels. Each of the side panels provide an inner surface and an outer surface that is oppositely disposed relative to the inner surface. In addition, each side panel of the pair of side panels has a top edge and a bottom edge oppositely disposed relative to the top edge. The terms top, bottom, inner and outer, are used merely for clarification purposes; however, these terms are in no way intended to limit the scope of the invention.

The cabinet also includes a top panel which is disposed proximate the top edge of the each of the side panels.

Similarly, a bottom panel is disposed proximate the bottom edge of each of the side panels.

The cabinet of this invention provides a tambour door disposed between the first side panel and the second side panel. The tambour door includes a plurality of slats. Each of the slats has a first longitudinal edge and a second longitudinal edge oppositely disposed relative to the first longitudinal edge. Transverse to the longitudinal edges, each slat includes a first lateral edge and a second lateral edge oppositely disposed from the first lateral edge. The tambour door is joined together by at least one mechanical hinge. In addition, the tambour door of this invention also includes at least one flex hinge between the first longitudinal edge and the second longitudinal edge and a slat midportion. The slat midportion is offset outward from the plane of the slat edge portions so as to define a hand grip whereby a user can grasp the tambour door and slide it upward. Together the mechanical hinge and the flex hinge cooperate to provide the necessary flexibility in the door.

Lastly, the cabinet of this invention includes an attachment mechanism. The attachment mechanism includes a plurality of joints disposed between the pair of side panels and the top panel. Similarly, a plurality of joints are disposed between the side panels and the bottom panel. At least one joint is disposed between the top panel and each side panel of the pair of side panels. Further, at least one joint is disposed between the bottom panel and each side panel of the pair of side panels. Specifically, the joints include a male anchor and a female socket which corresponds to the male anchor.

As can be best appreciated by one skilled in the art, the cabinet of this invention has several novel features. One novel feature of this invention is that the cabinet provides a tambour door that includes both a mechanical hinge and a flex hinge. Together the mechanical hinge and the flex hinge cooperate to achieve a substantially smoother camber thereby reducing the likelihood of the tambour door jamming while also reducing a the additional cost associated with constructing a tambour door solely with mechanical hinges.

Another novel aspect of this invention is that each slat of the tambour door is removable from the other slats that comprise the tambour door. Accordingly, the user may remove a slat when doing so is desirable. Specifically, the user may replace damaged slats or disconnect all of the slats for compact storage or the like.

One further novel aspect of this invention is the novel attachment mechanism utilized to interconnect the top panel and bottom panel to the pair of side panels. Specifically, the cabinet of this invention utilizes a male anchor and female socket to interconnect the respective panels. Advantageously, the cabinet of this invention reduces the skill required to assemble the cabinet. Instead of having to attach screws or nails to assemble the side and top and bottom panels together, the user of this invention merely needs to couple each male anchor with a corresponding female socket.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which:

FIG. 5 shows a fragmentary side view of the tambour door with the two slats joined together by the mechanical hinge;

FIG. 6 shows a fragmentary side view of a flex hinge on the tambour door of this invention;

DETAILED DESCRIPTION OF THE INVENTION

Figure 1:
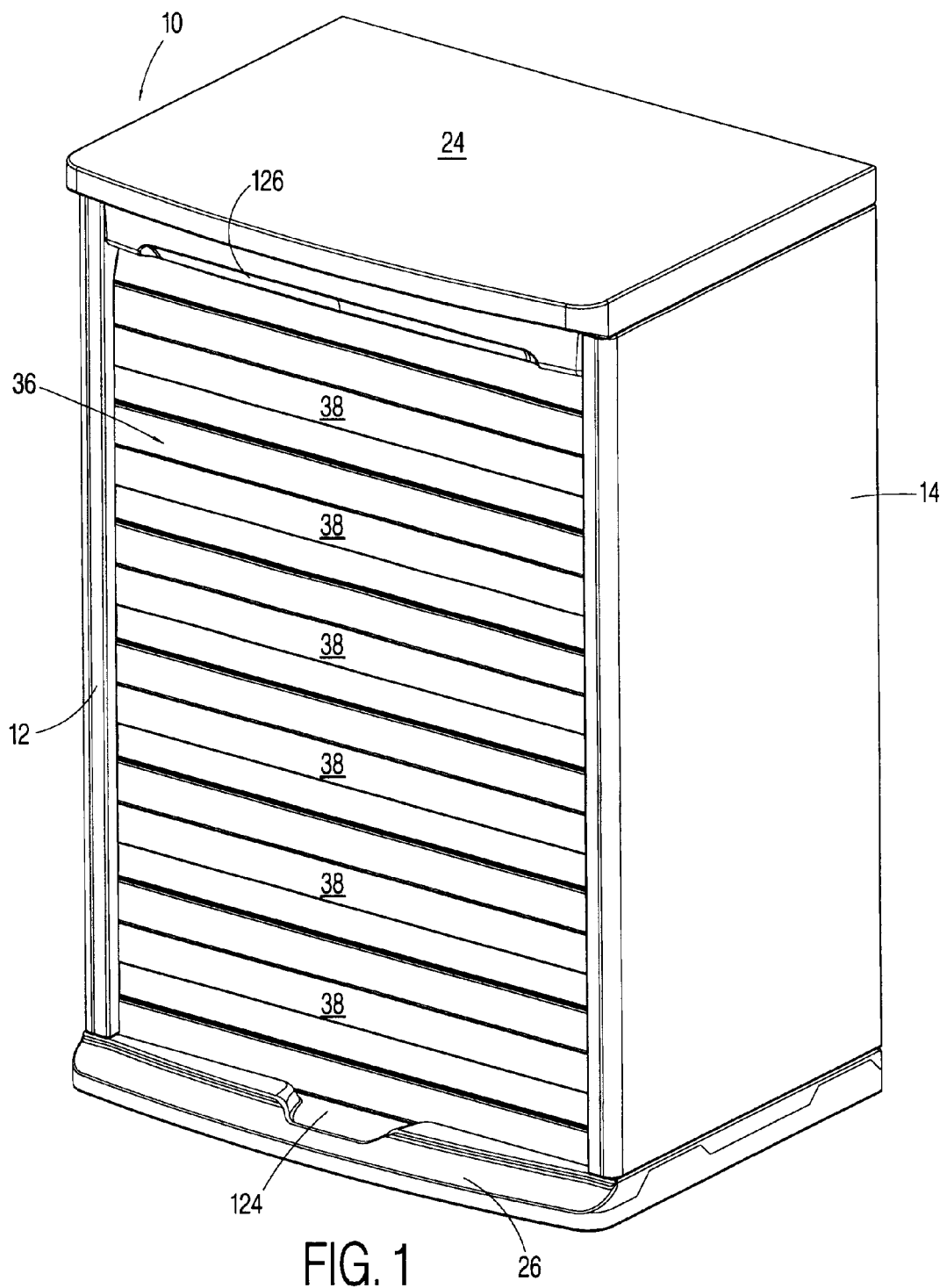
FIG. 1 shows a perspective view of a cabinet of this invention.
Figure 7:
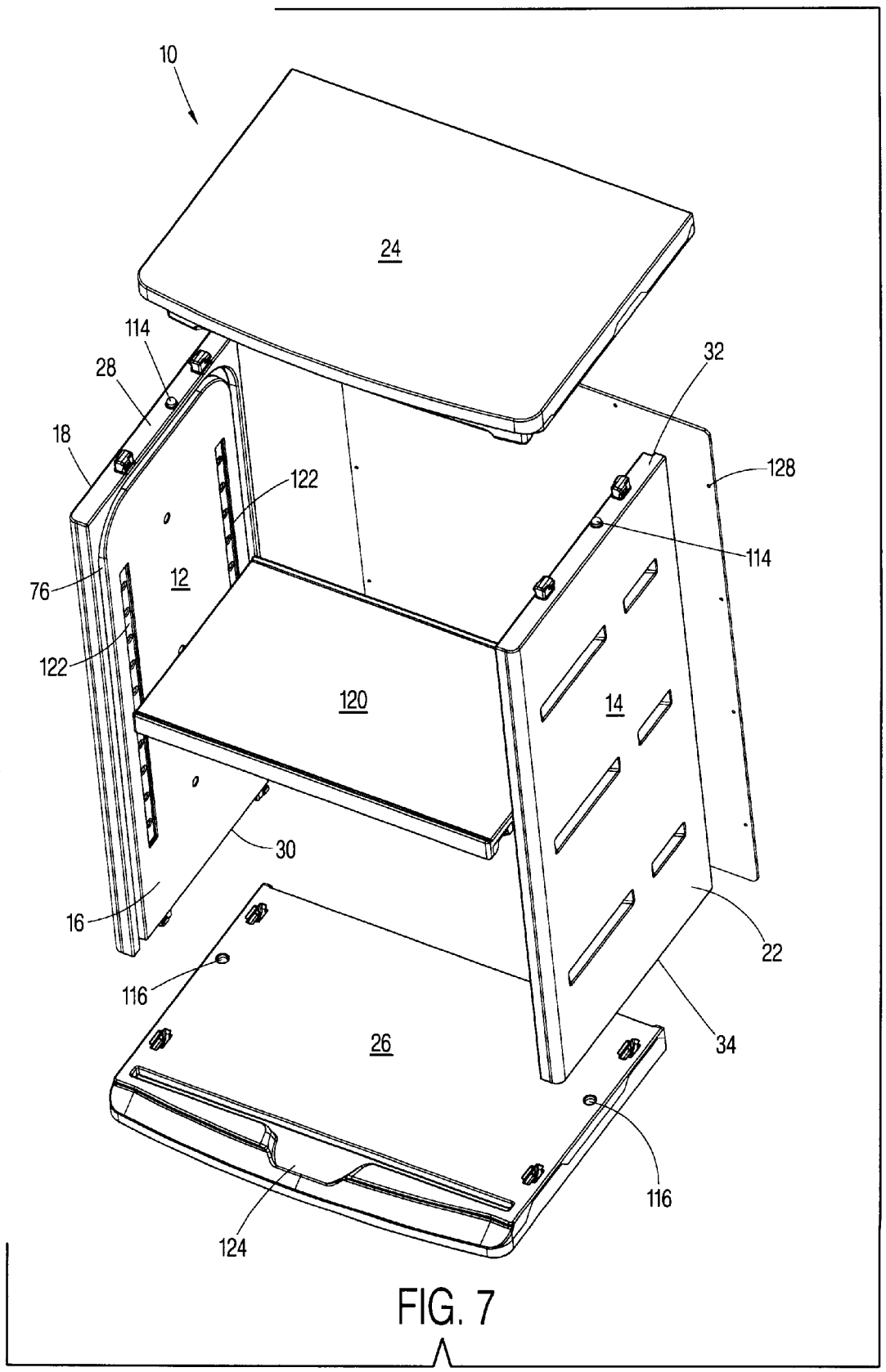
FIG. 7 shows an exploded perspective view of the cabinet with the tambour door removed.

A cabinet (10) is provided for storing articles. The cabinet includes a pair of side panels (12, 14). As shown in FIG. 1, the pair of side panels (12, 14) include a first side panel (12) and a second side panel (14). As shown in FIG. 7, the first side panel (12) has an inner surface (16) and an outer surface (18). Similarly, the second side panel (14) also has an inner surface (20) and an outer surface (22). The first side panel (12) includes a top edge (28) and an oppositely disposed bottom edge (30). Similarly, the second side panel (14) includes a top edge (32) and an oppositely disposed bottom edge (34).

Once again with reference to FIG. 1, the cabinet also includes a top panel (24) and a bottom panel (26). The terms top, bottom, outer, and inner are merely used for clarification purposes and should be interpreted as limited the scope of this invention. The top panel (24) is disposed adjacent the top edge (28) of the first side panel (12) and adjacent the top edge (32) of the second side panel (14). Similarly, the bottom panel (26) is disposed adjacent the bottom edge (30) of the first side panel (12) and the bottom edge (34) of the second side panel (14) thus having a generally rectangular shape. However, the cabinet (10) may have various other shapes without departing from the unique aspects of this invention.

Figure 2:
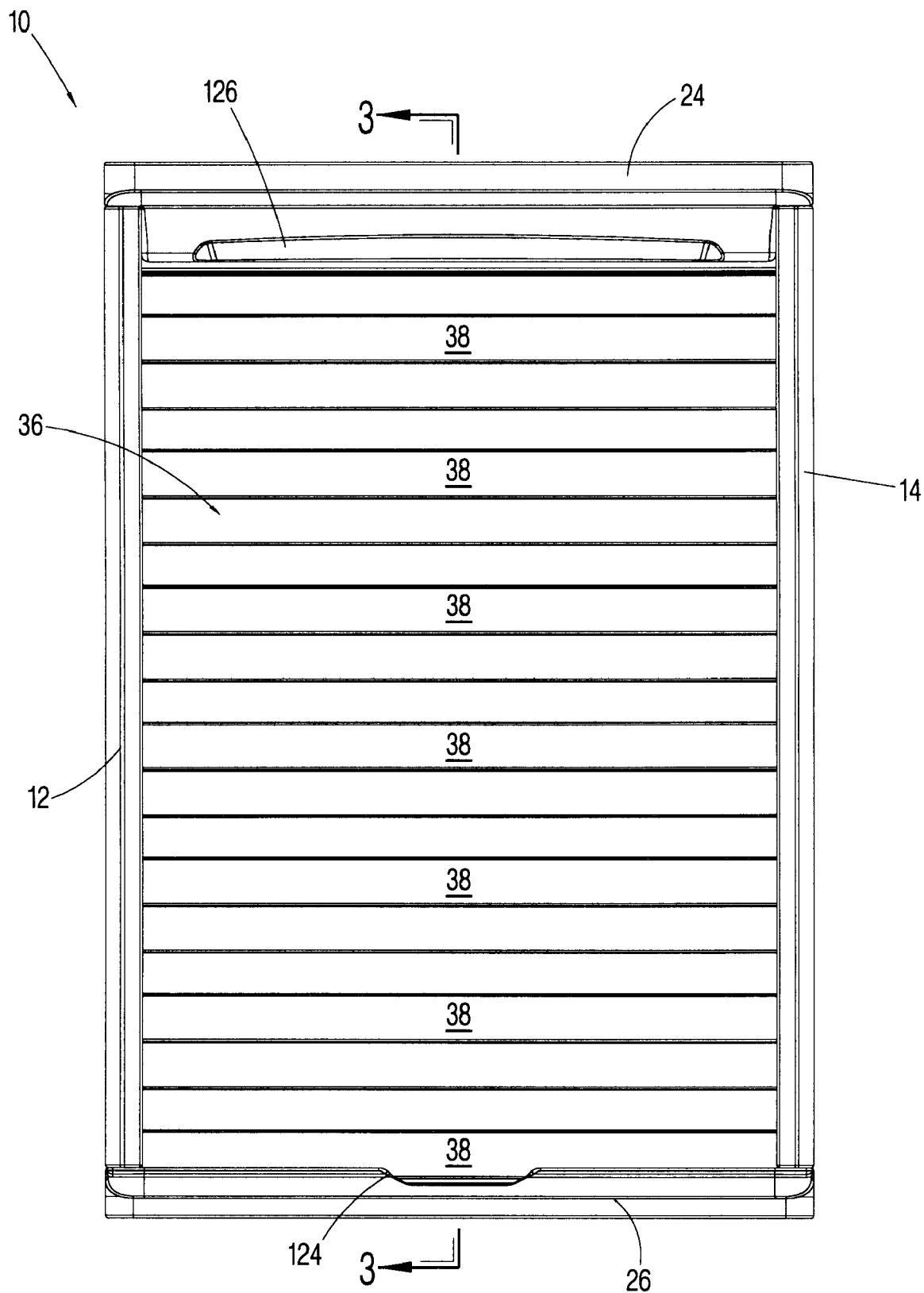
FIG. 2 shows a front elevational view of the cabinet.
Figure 3:
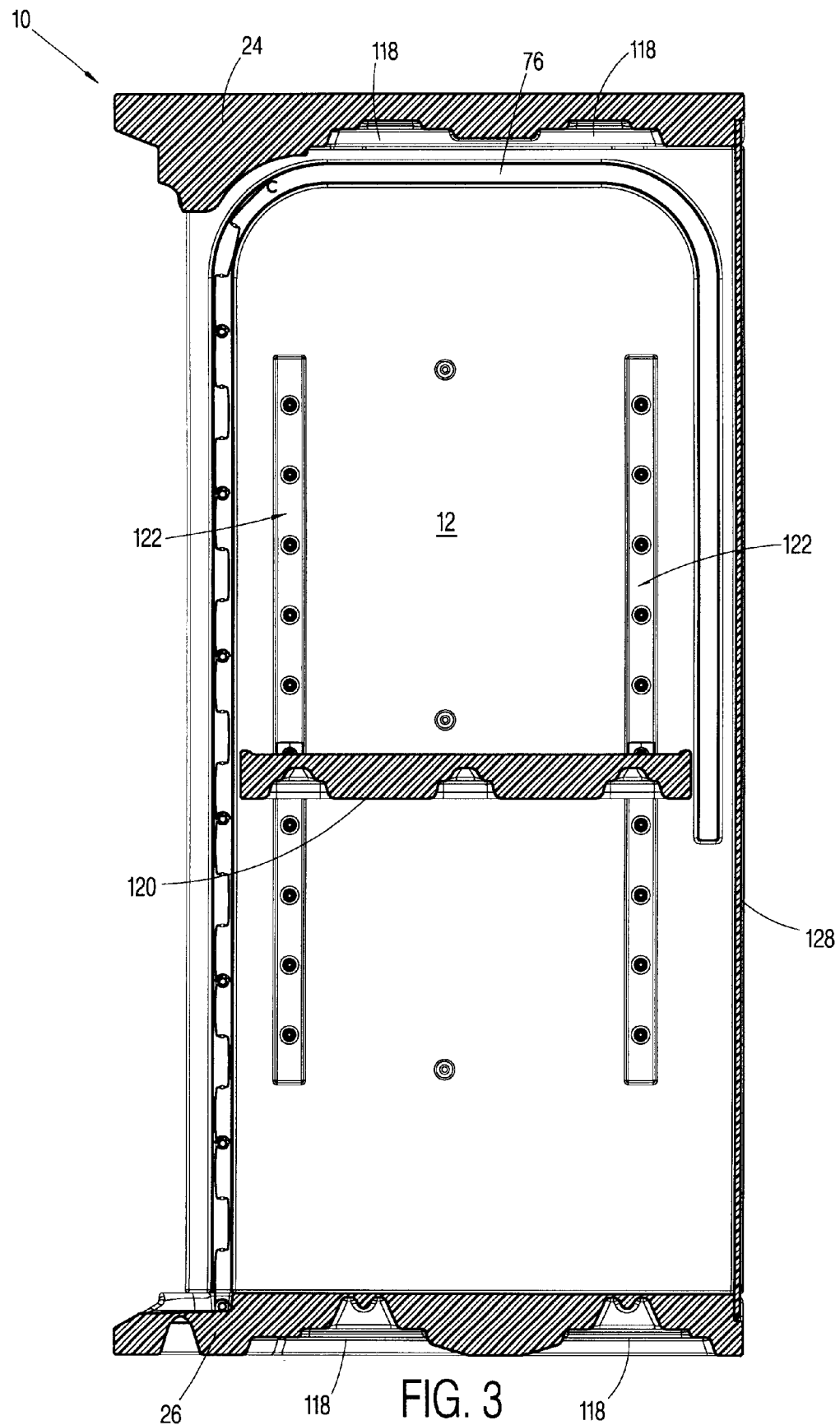
FIG. 3 shows a side cross-section of the cabinet along line 3—3.
Figure 4:
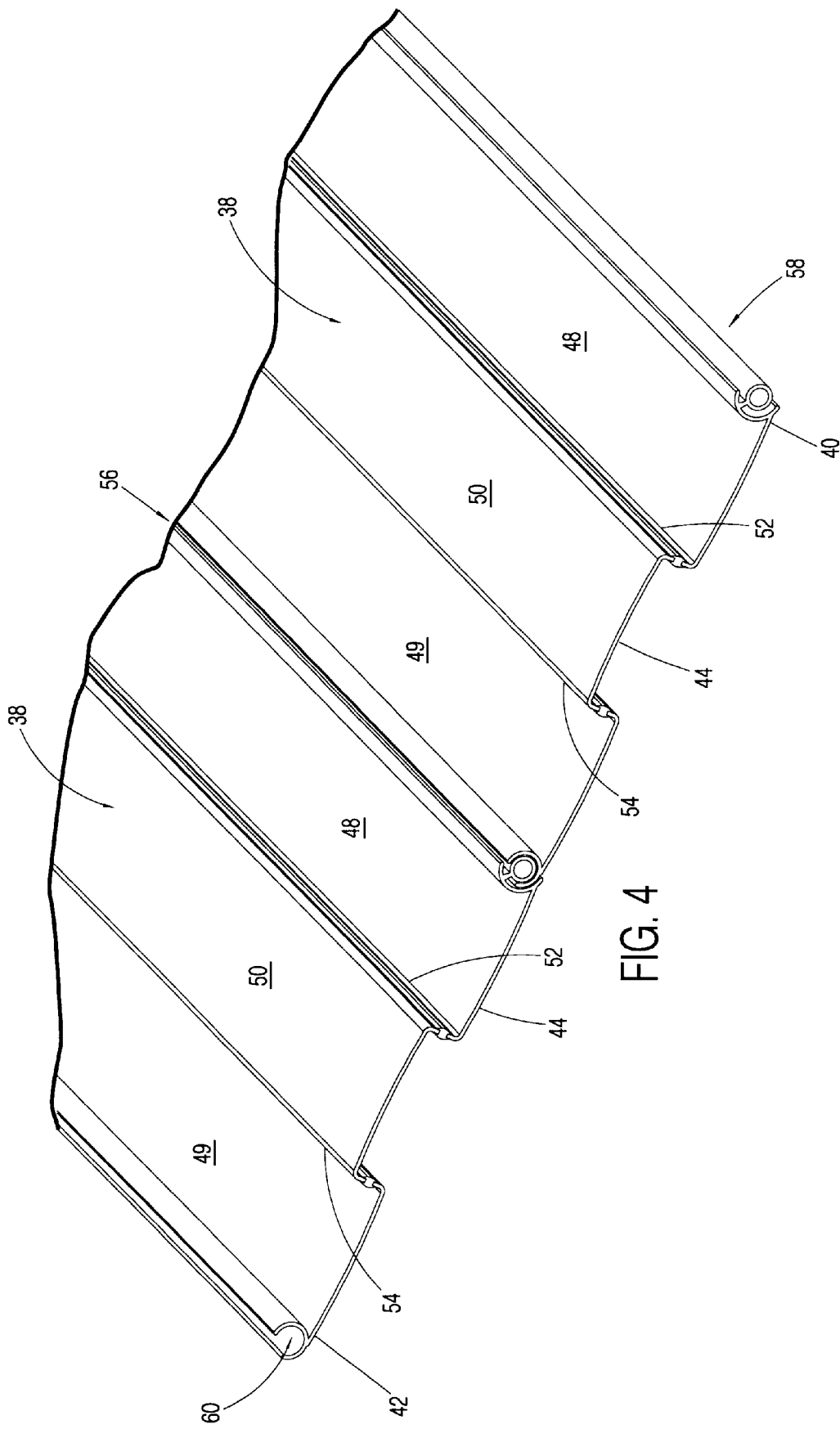
FIG. 4 shows a fragmentary perspective of a tambour door of this invention with two slats joined together by a mechanical hinge.

One unique aspect of this invention is that it includes a novel tambour door (36). As best appreciated with reference to FIG. 1 and FIG. 2 and FIG. 4, the tambour door (36) is disposed between the first side panel (12) and the second side panel (14). The tambour door is comprised of a plurality of slats (38). Each slat (38) has a first longitudinal edge (40) and a second longitudinal edge (42) oppositely disposed relative to the first longitudinal edge (40). Transverse to the lateral edges (40, 42), each slat has a first lateral edge (44) and a second lateral edge, not shown, oppositely disposed relative to the first lateral edge (44). Preferably, each slat (38) of the tambour door (36) includes a first planer portion (48) and a second planer portion (49) interconnected by a raised portion (50). Specifically, the raised portion (50) is connected to the pair of planer portions (48, 49) by a pair of erect portions (52, 54).

The tambour door (36) is connected together by a mechanical hinge (56). As best appreciated with reference to FIG. 4 and FIG. 5, in a preferred embodiment, the mechanical hinge (56) includes a male member (58) disposed along the first longitudinal edge (40) and a female member (60) is disposed along the second longitudinal edge (42). Specifically, the male member (58) has a post (62), a cover (64), and a flange (66) interconnecting the post (62) to the cover (64). The female member (60) is a sleeve (68) having a slot (70). The post (62) of the male member (58) is received within the sleeve (68) of the female member (60). However, various other mechanical hinges (56) may be utilized without departing from the novel aspects of this invention.

As the male member (58) is pivoted relative to the female member (60), the degree to which the mechanical hinge (58) is allowed to pivot is limited by the interaction of the slot (70) and the flange (66). One skilled in the art can appreciate that a wider slot (70) or a narrower flange (66) would allow the mechanical hinge (56) to rotate a greater degree. However, a narrower slot (70) or a wider flange (66) would result in a smaller degree of rotation.

In addition to the mechanical hinge (58), the tambour door (36) of this invention includes at least one flex hinge (72). As shown in FIG. 6, the flex hinge (72) is a flexible portion (74) of the tambour door (36). Preferably, each slat (38) includes two flex hinges (72) which separate lateral edges (44) and (46) from raised portion (50). The slat raised portion (50) is displaced from the plane of the edges (44), (46) by the erect portions (52) and (54). As will be appreciated, when the door is mounted in the cabinet, the raised portion (50) or each slat will be oriented toward the user. The out of plane raised portion (50) provides a finger grip edge whereby a user can grasp the door and move it along its track. Thus, multiple finger grip edges, one for each slat, are available to a user to grasp and move the door. It will further be appreciated that the out of plane raised portion (50) gives, aesthetically speaking, depth and a three dimensional appearance to the slat and produces the door which comprises a series of such slats has, accordingly, enhanced aesthetic appeal. The width of raised portion (50) and edges (44) and (46) are substantially the same, such that each slat appears to comprise three slats. Most preferably, a flex hinge (72) is disposed on the first erect portion (52) and a flex hinge (72) is disposed on the second erect portion (54). One skilled in the art can appreciate that this unique placement of the flex hinge (72) conceals the flex hinge (72) from the user's immediate view while in use. However, the number or placement of the flex hinges (72) and mechanical hinges (56) may be varied as required for a particular application of this invention without deviating from the novel aspects of this invention.

In another preferred embodiment, the mechanical hinge (40) and the flex hinge (72) are both integrally formed with each slat (38). Most preferably, the flex hinge (72) is constructed of PVC which is bonded into each slat (38). Also, the tambour door (36) is secured between the first side panel (14) and the second side panel (14) by a first channel (76) disposed on the first side panel (12) and a second channel, not shown, disposed on the second side panel (14). The first channel (76) is sized to receive the first lateral edge (40) of each slat (38). Similarly, the second channel, not shown, is sized to receive the second lateral edge (46) of each slat (38). Ideally, the first channel (76) and the second channel (78) are integrally formed with the first side panel (12) and the second side panel (14), respectively.

Figure 8:
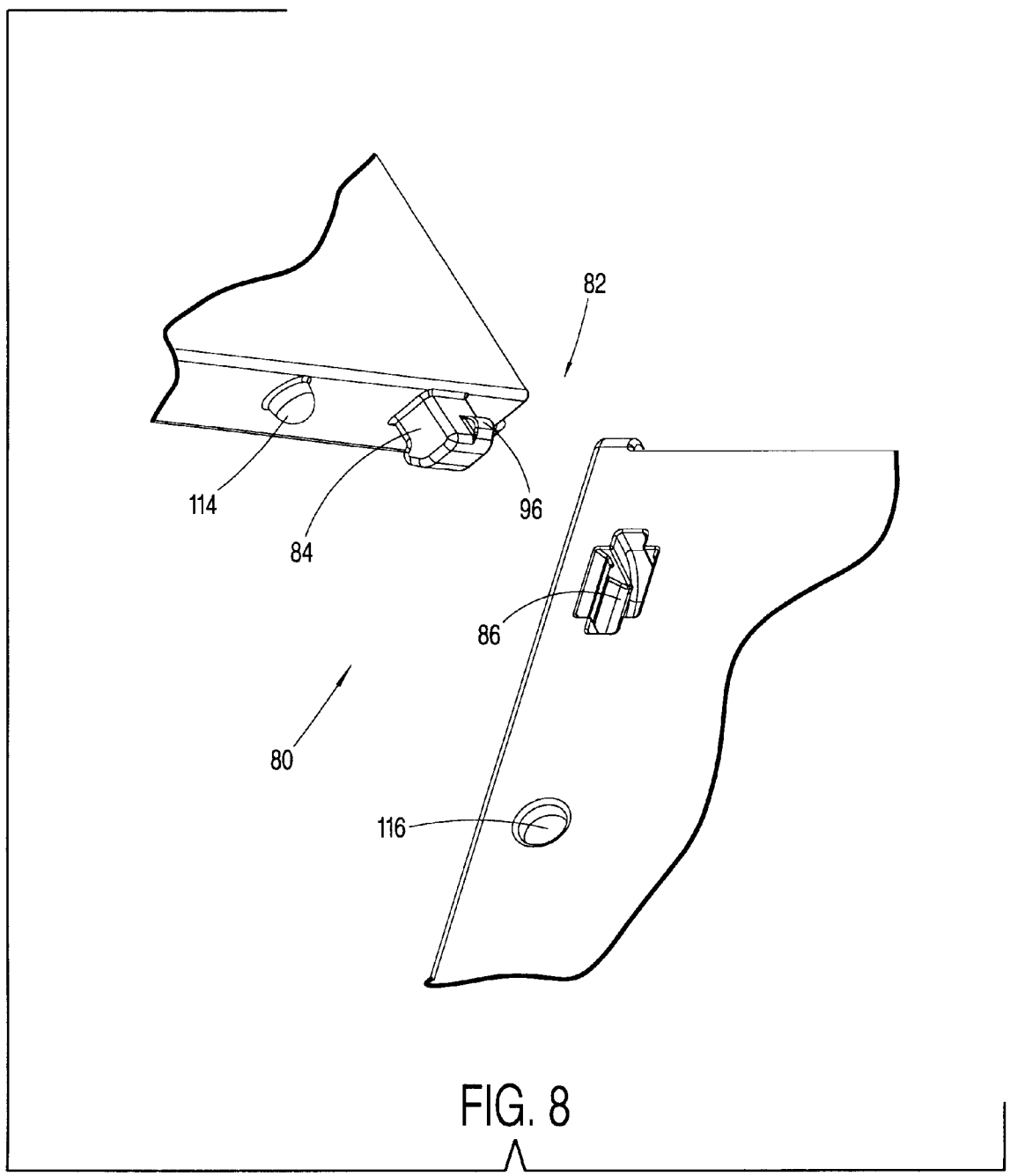
FIG. 8 shows a fragmentary exploded view of the cabinet with a male anchor and a female socket.
Figure 9:
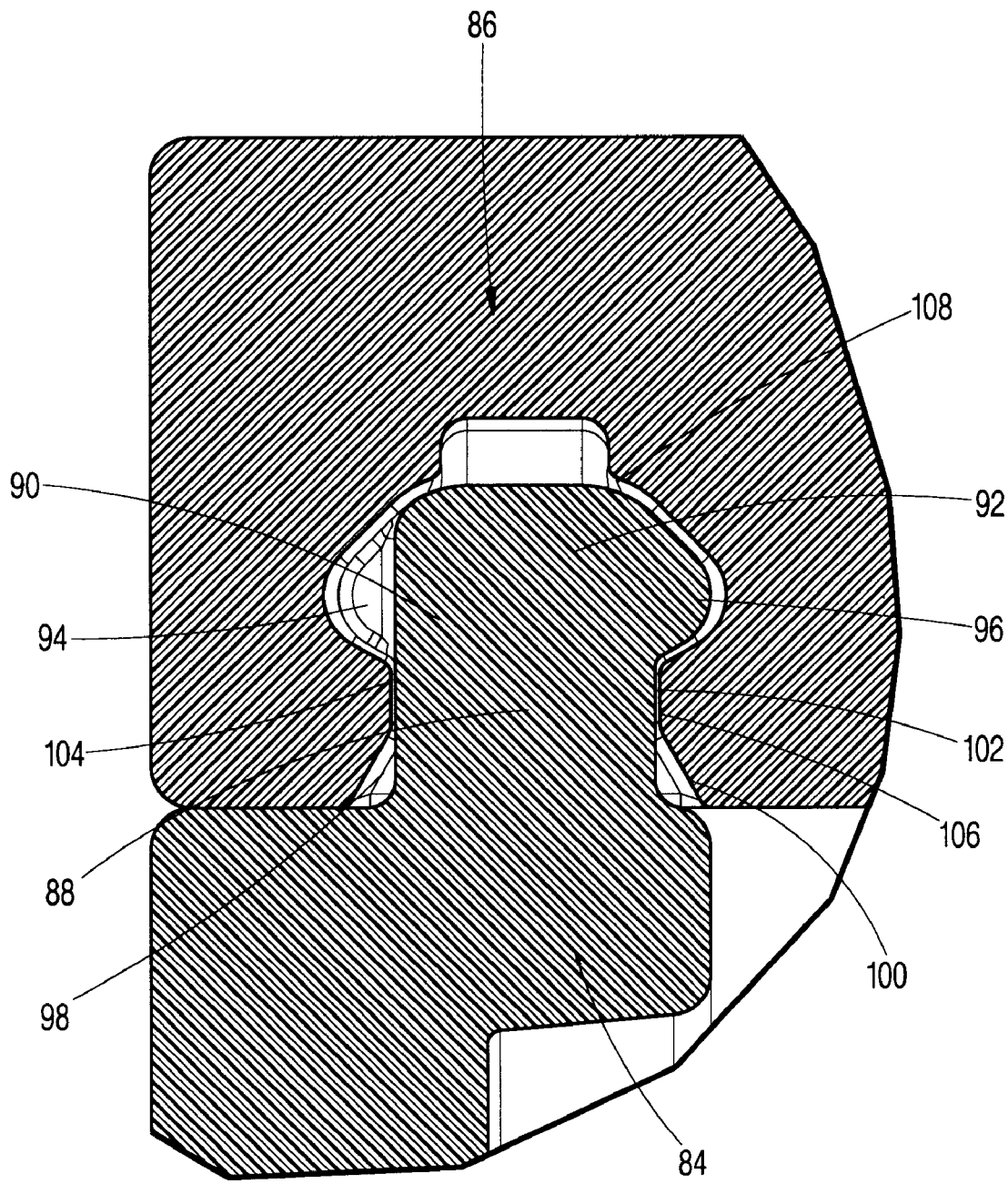
FIG. 9 shows a fragmentary cross-section of the top panel and the first side panel cut through the joint with the male anchor and the female socket coupled together.

Another unique aspect of this invention is that the top panel (24) and the bottom panel (26) are secured to the pair of side panels (12, 14) by a novel attachment mechanism (80). The attachment mechanism (80) includes at least one joint (82) disposed between the top panel (24) and each side panel of the pair of side panels (12, 14), and at least one joint (82) between the bottom panel (26) and each side panel of the pair of side panels (12, 14). As seen in FIG. 8 and FIG. 9, each joint (82) includes a male anchor (84) and a female socket (86). The at least one joint (82) between the top panel (24) and each side panel of the pair of side panels (12, 14) and the at least one joint (82) between the bottom panel (26) and each side panel of the pair of side panels (12, 14) operates to secure the respective panels when the male anchor (84) is coupled with the female socket (86). With particular reference to FIG. 9, the male anchor (84) includes a shank portion (88) which terminates at a head portion (90). The head portion includes a central portion (92). Extending normal to the shank portion (88) is the first flange (94) and a second flange (96) oppositely disposed relative to the first flange (94) and also extending normal relative to the shank portion (88). Preferably, the first flange (94) and the second flange (96) are globally arcuate in shape. As best appreciated in FIG. 8, a most preferred embodiment of this invention provides that the second flange (96) extends along only a portion of the head (90). Similarly, the first flange (94) also extends along only a portion of the head portion (90) (not shown in FIG. 8).

The female socket (86) includes a first sloped portion (98) and an oppositely disposed second sloped portion (100). The first sloped portion (98) and second sloped portion (100) terminate at a passage (102). The passage (102) is defined by a first wall (104) and a second wall (106). Lastly, the passage (102) terminates, oppositely from the first sloped portion (98) and the second sloped portion (100), at an undercut (108). The undercut (108) is defined by a first pit (110) and a second pit (112). The female socket (86) couples with the male anchor (84) to provide a secure joint (82). Ideally, the head portion (90) of the male anchor (84) corresponds with the undercut (108). Similarly, the shank portion (88) corresponds with the passage (102).

Most preferably, each joint (82) of this invention is integrally formed with the cabinet (10). Specifically, at least one male anchor (84) is formed on the top edge (28), and at least one male anchor is formed on the bottom edge (30) of the first panel (12) and the second panel (14). Similarly, corresponding female sockets (86) are formed with both the top panel (24) and the bottom panel (26).

Additional preferred features of this invention include a boss (114) which is sized and shaped to be receivable in a depression (116). As shown in FIG. 8, a boss (114) may be provided on the first side panel (12) and a corresponding depression (116) may be provided on the bottom panel (26), as shown, or on the top panel (24), not shown. The boss (114) and depression (116) cooperate for registering the appropriate panels together in the orientation necessary for proper assembly.

Another preferred feature of this invention is that this invention includes at least one recess (118) formed into the bottom panel (26) and at least one recess (118) formed into the top panel (24). One skilled in the art can best appreciate that the incorporation of the recesses (118) provides a means for registering the panels together in the orientation necessary for proper assembly. The cabinet also includes a first hand opening (124) disposed on the bottom panel (26) and a second hand opening (126) disposed on the top panel (24). Also, the cabinet may include a rear panel (128) which is secured to at least the pair of side panels (12, 14) by screws, or other conventional hardware.

Finally, one additional preferred feature of this invention is the inclusion of at least one shelf (120). The shelf (120) is disposed between the first side panel (12) and the second side panel (14). Ideally, the shelf (120) is retained in place by a plurality of posts, not shown, and a corresponding plurality of holes (122). Ideally, the shelf is retained in position by a pair of holes (122) disposed on the first side panel (12) and a corresponding pair of holes, not shown, on the second side panel (14). The plurality of holes (122) allows for the shelf (120) to not only be secured to the cabinet (10), it also allows for the position of the shelf (120) to be adjustable.

In use, the user of this invention can easily assemble the cabinet (10) without having to be adept at construction techniques. Specifically, the user can assemble the above cabinet (10) by coupling each joint (82) together. Specifically, the user of this invention places each male anchor (84) adjacent a corresponding female socket (86) such that the head portion (90) is between the first sloped portion (98) and the second sloped portion (100). The user then pressed male anchor (84) down into the passage thus causing the first flange (94) and the second flange (96) to flex inward while also simultaneously causing the passage (102) to flex outward. Once the head portion is forced forward into the undercut portion (108), the passage will elastically spring inward to grasp the shank portion (88) of the male anchor (84). Similarly, the head portion (90) will elastically spring outward such that the head portion (90) is grasped by the undercut portion (108) of the female socket (86).

As for the tambour door (36), the user simply couples each slat (38) together to form the tambour door (36) of this invention. Next, the user places the first lateral edge (40) of each slat (38) within the first channel (76). Similarly, the user places the second lateral edge, not shown, of each slat (38) within the second channel (78). Once completed, the cabinet of this invention is assembled. While in use, the user may slid the tambour door (36) between an open position and a closed position by sliding the tambour door (36) along the pair of channels (76, 78). The configuration of the door slats is such so as to provide convenient means for the user to grasp the door and initiate its sliding motion. Moreover, the configuration of each slat to have a raised, out of plane center portion of substantially equivalent width as the lateral edge portions of the slat, makes each slat appear as though three slats. The out of plane center portion provides the means to grasp each slat and move the door and adds a three dimensional affect to the door, enhancing its aesthetic appeal.

One skilled in the art can appreciate that the above disclosed invention provides several advantageous. First, the user of this invention can assemble the cabinet (10) in an uncomplicated manner. As discussed previously, to assemble the cabinet (10) of this invention the user simply needs to couple each joint (82). One can appreciate that the above construction method has several advantages over prior construction techniques. First, to assemble the door, side panels and top and bottom panels of the cabinet (10) of this invention, the user does not require tools. A screw driver is required to attach the rear panel to the assembly by appropriate hardware. Further, the attachment mechanism (80) of this invention is not prone to being lost or mislaid by the user or during shipment since each male anchor (84) and each female socket (86) is integrally with the cabinet (10).

Another advantage is the novel tambour door (36) of this invention that reduces the likelihood of becoming jammed. This advantage is achieved by the inclusion of the mechanical hinge (58) and the flex hinge (72). Together the flex hinge (72) and the mechanical hinge (58) cooperate to provide greater flexibility while also not increase labor costs and manufacturing costs. An increase in cost would occur if merely mechanical hinges is utilized.

Anther advantage is that this invention includes mechanical hinges (58). The mechanical hinges (58) of this invention allow for each slat (38) to be manufactured separately. Also, the tambour door (36) may be shipped or stored disassembled. In the preferred embodiment, the cabinet panels are not intended to be disassembled after assembly. However, the subject door may find use in other applications in which assembly and disassembly is a requirement for the product. In such applications, a particular slat (38) may be removed at the option of the user. Doing so may be desirable when a particular slat has become damaged.

While this invention has been described in terms of a preferred embodiment, it is apparent that other forms could be adopted by one skilled in the art, for example modifying the appearance or structure of the cabinet. Accordingly, the scope of this invention is to be limited only by the following claims.

What is claimed is:

1. A cabinet for storing articles comprising:
   a pair of side panels, each side panel having an inner surface and an outer surface oppositely disposed from said inner surface, each side panel further including a top edge and an oppositely disposed bottom edge, each side panel including a forward edge and an opposite disposed rearward edge, each side panel including a pair of supports disposed on said inner surface, each support of said pair of supports being a plurality of apertures, each side panel of said pair of side panels including a channel disposed on the inner surface;
   a top panel disposed proximate said top edge of said first panel and said top edge of said second panel;
   a bottom panel disposed proximate said bottom portion of said first side panel and said second side panel;
   a tambour door disposed between said first side panel and said second side panel, said tambour door having a plurality of slats, each slat having a first longitudinal edge and an oppositely disposed second longitudinal edge, each slat further including a first lateral edge and a second lateral edge, said tambour door including a mechanical hinge, said mechanical hinge including a male member integrally formed along said first longitudinal edge of each slot and a female member integrally formed along the second longitudinal edge of each slat, each female member being coupled with a male member on an adjacent slat such that each slat is hingedly connected to said adjacent slat, said tambour door further including at least one flex hinge formed in each slat, said slat having a rigid portion and a flex hinge, said flex hinge being a flexible portion; and
   an attachment mechanism interconnecting the top panel and the lower panel to the pair of side panels, said attachment mechanism including a plurality of joints, each joint comprising a male anchor disposed on at least one panel and a socket disposed on a corresponding panel, said male anchor including a shank portion and a head portion, the heading portion including a first flange portion and an oppositely disposed second flange portion, said socket comprising an inwardly sloped portion, a passage adjacent the inwardly sloped portion, and an undercut portion adjacent the passage portion, the passage being sized and shaped to mate with said shank and said head being sized and shaped to mate with said undercut portion.

2. A tambour door as recited in claim 1, wherein the outer edges of the first and second edge portions have a complementary connecting configuration enabling one said slat to connect with a like-configured second slat.

3. A tambour door of the type slidably connected between side panels of a cabinet, the door comprising:
- a plurality of slats, at least on slat of said plurality of slats having a first longitudinal edge portion and a second longitudinal edge portion oppositely disposed from said first longitudinal edge portion, and a raised midportion disposed between the first and second edge portions;
- a first connective slat portion and a second connective slat portion connecting inward edges of the first and second edge portions to opposite outward edges of the slat midportion, at least one of the first and second connective slat portions comprise a flexible hinge composed of resilient material; and
- the raised slat midportion is out of plane from the first and second edge portions and defines a handle to a user for manually grasping the door.

4. A tambour door as recited in claim 3, wherein the outer edges of the first and second edge portions pivotally connect to form a mechanical hinge.

5. A cabinet for storing articles comprising:
- a pair of side panels, each side panel of said pair of said panels having an inner surface and an outer surface oppositely disposed from said inner surface; and
- a tambour door having a plurality of slats, at least one slat of said plurality of slats having a first longitudinal edge and a second longitudinal edge oppositely disposed from said first longitudinal edge, said slat further including a first lateral edge and a second lateral edge oppositely disposed from said first lateral edge, said tambour door further comprising at least one mechanical hinge interconnecting said plurality of slats, said tambour door further comprising at least one flex hinge disposed on at least one slat of said plurality of said slats;
- said mechanical hinge includes a male member disposed along said first longitudinal edge of each slat of said plurality of slats and a female member disposed along the second longitudinal edge of each slat of said plurality of slats;
- said female member comprises a sleeve having a longitudinal slot;
- said male member is a cover attached to the slat, a post, and a longitudinal flange interconnecting said cover to said post;
- said male member is integrally formed with each said slat and said female member is integrally formed with each said slat.

6. A cabinet as recited in claim 5 wherein said flex hinge is a flexible portion formed with each slat of said plurality of slats.

7. A cabinet as recited in claim 6 wherein said flexible portion is PVC.

8. A cabinet as recited in claim 7 wherein said first side panel and said second side panel each include a channel, said first lateral edge of each slat being slidably engaged with said channel of said first panel and said second lateral edge of each slat being slidably engaged with said channel on said second panel.

9. A cabinet as recited in claim 8 wherein said first channel is integrally formed with said first side panel and said second channel is integrally formed with said second side panel.

10. A cabinet as recited in claim 9 wherein said cabinet further comprises:
- a top panel disposed proximate said top edge of said first panel and said top edge of said second panel; and
- a bottom panel disposed proximate said bottom portion of said first side panel and said second side panel.

11. A cabinet as recited in claim 10 wherein said attachment means comprises a plurality of joints interconnecting said pair of side panels with said bottom panel and said top panel, each joint comprising a male anchor and a socket.

12. A cabinet as recited in claim 11 wherein each said male anchor comprises a shank portion and a head portion, the head portion including a first flange portion and an oppositely disposed second flange portion and wherein said socket comprises an inwardly sloped portion, a passage adjacent the inwardly sloped portion, and an undercut portion adjacent the passage portion, the passage being sized and shaped to mate with said shank and said head being sized and shaped to mate with said undercut portion.

13. A cabinet as recited in claim 12, wherein at least one male anchor is integrally formed with each side panel of said pair of side panels and wherein at least one female socket is integrally formed with each side panel of said pair of side panels.

* * * * *